Sept. 9, 1930.   A. L. HENSCHEL   1,775,345
CALCIMINE MIXER
Filed Oct. 22, 1929   2 Sheets-Sheet 1
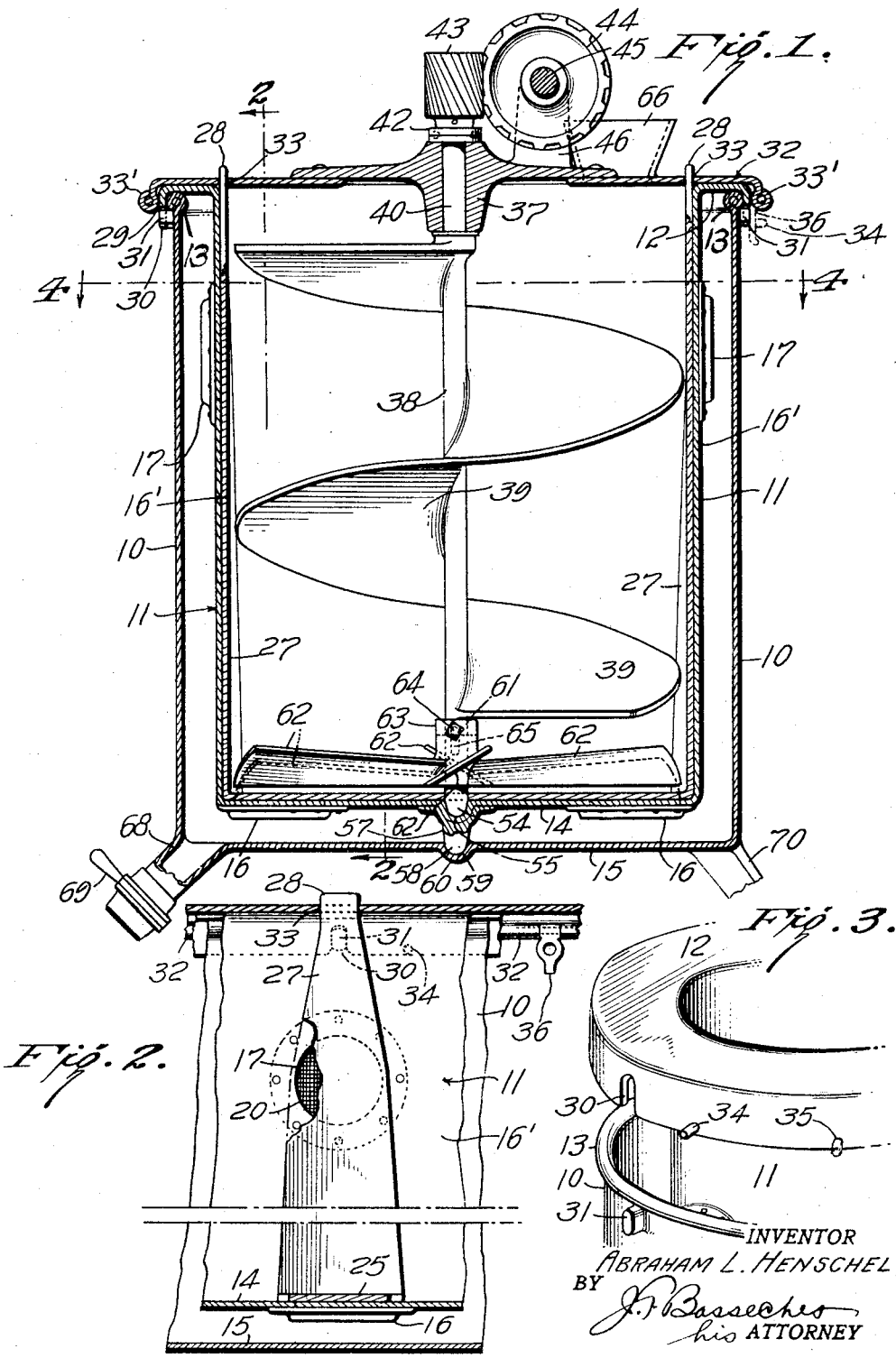
INVENTOR
ABRAHAM L. HENSCHEL,
BY J. F. Basseches
his ATTORNEY Sept. 9, 1930.  A. L. HENSCHEL  1,775,345
CALCIMINE MIXER
Filed Oct. 22, 1929    2 Sheets-Sheet 2
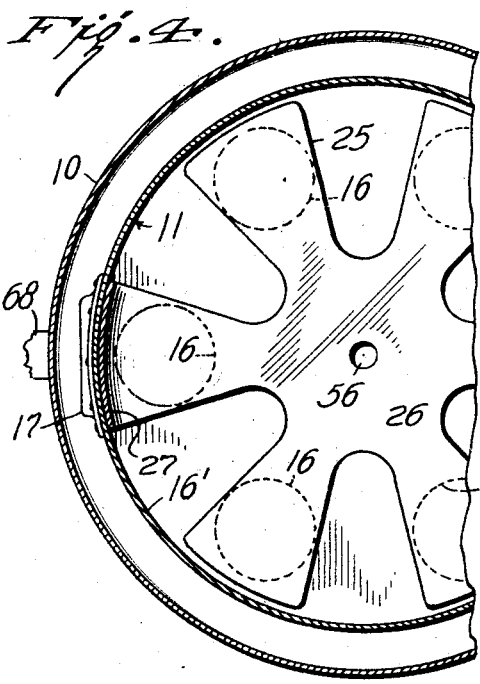
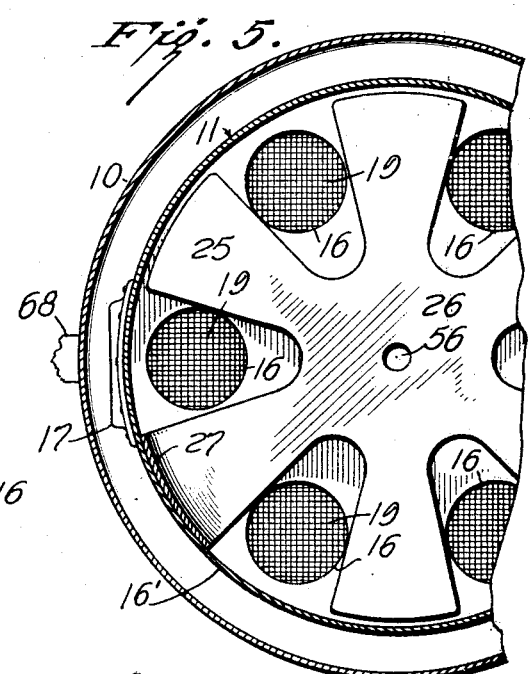
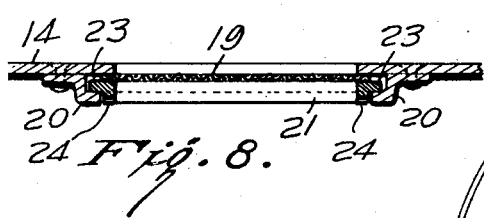
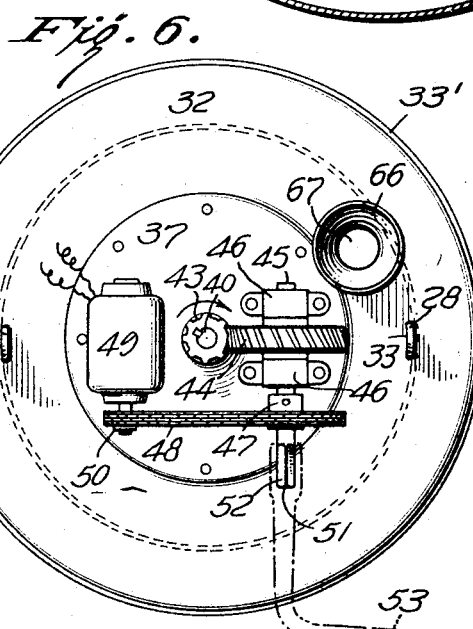
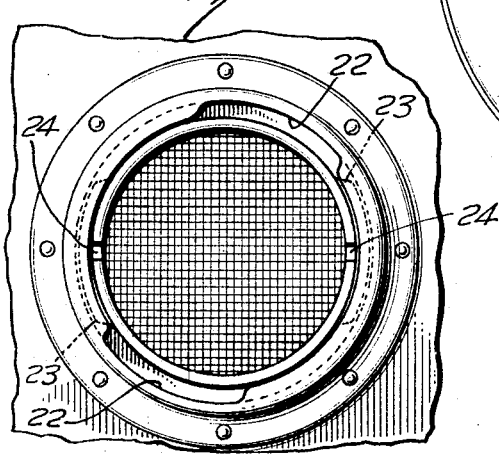
INVENTOR
ABRAHAM L. HENSCHEL,
BY
his ATTORNEY Patented Sept. 9, 1930

1,775,345

UNITED STATES PATENT OFFICE

ABRAHAM L. HENSCHEL, OF NEW YORK, N. Y.

CALCIMINE MIXER

Application filed October 22, 1929. Serial No. 401,544.

This invention relates to apparatus for preparing a calcimine mixture or cold water paint and to apparatus for dispensing the same.

The present marketable product comprising calcimine and similar cold water paints, constituting a pigment, such as chalk, in connection with a gelatinous bond, such as glue, because of the gellifying qualities of the latter ingredient, is readily separated and forms a sediment of the pigment. This has been one of the primary reasons why water paints found on the market in the dry form have been made available for use by the addition of water. To make this material ready for use in accordance with best practice, commercial calcimine and similar water paints must then be intimately mixed on the job and the labor involved in effecting a proper admixture and, in addition, separating gritty and sandy particles, is a tedious and painstaking operation and because thereof, the proper mixture is not usually obtained.

It is therefore an object of my invention to provide a mixing apparatus for water paints, particularly cold water paints, such as calcimine, which will permit speedy preparation of the calcimine mixture, ready for application by the ordinary brush, spray or air brush, in uniform quality, in accordance with the best formulas and free from sedimentation or objectionable sandy or gritty particles whereby a uniform film is obtained when painted on a surface, permitting its use with an air brush or spray, without destroying the function of this apparatus by reason of the nature of the pigment used in cold water or so-called calcimine paints.

Still further objects of my invention reside in preparing a uniform and fine textured water paint, such as calcimine and for an apparatus which provides means for, in one operation, preparing a fine textured calcimine product and at the same time screening therefrom objectionable gritty products which cannot be suspended in the aqueous vehicle and the gelatinous material dissolved therein.

It is contemplated by my invention to provide an apparatus for quickly and uniformly preparing a cold water paint, such as calcimine, including a stirring apparatus which will suspend the major portion of the pigmenting material in the aqueous vehicle and in a small period of time, without requiring transference of the liquid, obtain a filtering action of the suspension thus prepared to separate therefrom objectionable gritty or sandy particles, the device acting as a dispensing apparatus, after the calcimine has been once prepared whereby it may be conveniently used for the supply of the water paint or calcimine right on the job where it is prepared.

It is further contemplated by my invention to provide a mixing apparatus for water paint such as calcimine which may be used to partially prepare a suspension of the pigmenting material in the aqueous vehicle, uniformly and finely prepare the suspension and filter the product, all within one container or receptacle arranged so that it requires a minimum amount of handling of the material and by simplicity of construction assuring a high economy in manufacturing of the apparatus.

To attain these objects and such further objects as may appear herein or be hereinafter pointed out, I make reference to the accompanying drawing forming a part hereof, in which—

Figure 1 is a sectional view in side elevation of my device;

Figure 2 is a section taken on the line 2—2 thereof;

Figure 3 is a perspective view with the lid removed and the parts in partially uncovered position;

Figure 4 is a fragmentary sectional view taken on the line 4—4 of Figure 1 with the stirrer member removed;

Figure 5 is a similar view with the valving veins in the open position;

Figure 6 is a plan view of my device;

Figure 7 is a fragmentary detail view of the screen members.

Figure 8 is a diagrammatic sectional view of the same.

Making reference to the drawings, my device comprises generally the receptacle 10, having interiorly disposed thereof a second receptacle 11, which is provided with a flange 12, resting on the edge 13 of the first receptacle, to hold the bottom thereof 14 spaced from the bottom 15 of the receptacle 10. The interior receptacle 11 is provided with a plurality of bottom orifices 16 and side orifices 17, each of which has disposed exteriorly thereof a layer of screen or gauze, preferably of metal 19, held in position by the flanges 20 and the cooperating collar 21. This type of locking means for the screen or gauze is more specifically illustrated in Figures 7 and 8. In these views it will be observed that the flange 20 has bayonet slots 22 cooperating with the lugs 23 formed on the collar 21. The lateral lugs 24 are formed on the collar to facilitate the turning of the collar from the original entry position, through the slots 22 to the locking position shown in Figure 7. Positioned adjacent the orifices 16 and interiorly of the receptacle bottom 14, there is provided a valving mechanism comprising the veins 25, all joined centrally at 26. The veins 25 are provided in number to cover each of the orifices 16 on the bottom, as shown more clearly in Figures 4 and 5. These veins may be bodily moved by the side branches 27 connected with the bottom veins, which extend upwardly adjacent the side walls of the receptacle 16' to cover the orifices 17 in the side walls, when the veins are in the closed position as shown in Figure 4 and have an operating extension 28 disposed beyond the flange 12 and the edge 13 of the interior and exterior vessels, respectively.

The flange 12 has its upwardly turned edge 29 formed with a keying slot 30 arranged to engage a stop or lug 31, formed on the exterior of the receptacle 10. In its normal position, the keying slots 30 and lug 31 are as shown in Figure 1, preventing relative rotation of the receptacles 10 and 11. A cover member 32 is provided, which has a beaded ridge 33' disposed over the flange 12, in its normal position and this cover member is provided with the openings 33, through which the lug 28 extends, holding the sections 27 and the veins 25 to which is is connected in keyed position with the cover 32. The flange 12 is also provided with diametrically opposed pins 34 and 35, which serve to engage a locking hinge 36, disposed from the beaded ridge 33. In this manner, in the position as shown in Figure 1, the interior receptacle 11 and the lid 32, as well as the sections 27, all are locked against rotary movement.

Centrally of the cover member 32 there is riveted or otherwise affixed a bearing boss 37, to which the stirrer assembly 38 is mounted for relative rotary movement. This comprises the helical blades 39, mounted upon the shaft 40, disposed downwardly from the cover member 32 and having its free end 41 provided with a bearing collar 42 and a worm 43. Spaced laterally of the worm 43, there is provided a worm wheel 44, mounted on the shaft 45, which is held in geared position by the standards 46. One free end of the shaft 45 has keyed thereto a gear 47, adapted to be driven by the chain or belt 48, which in turn may be driven by the electric motor 49, having a driving gear 50 mounted thereon. Optionally, however, the shaft 45 extends beyond the gear 47 and its free end 51 is provided with a squared portion 52 adapted to be rotated by the crank 53, shown in dotted line in Figure 6. In this manner, the shaft 40 may be rotated, either by means of the motive power utilizing the motor 49 or manual power, utilizing the crank 53.

The interior end 54 of the shaft 40 is preferably disposed within a bearing depression 55 formed in the central portion of the interior receptacle 11, whereby the free end of the shaft 40 may be held in the central position. This end of the shaft also serves to centrally dispose the veins 25 and passes through the opening 56 formed in the central portion 26 of the veins. Exteriorly of the vessel 11, at its lower central portion, there is provided a stud 57 which has its free end 58 resting within the bearing portion 59, preferably made by depressing the body of the metal 15 as shown at 60. In this manner, the receptacle 11 is held in the central position against displacement. The shaft 40 also has an extension 61, beyond the blades 39, upon which is mounted an additional set of mixing blades 62, whose central boss 63 bears upon the extension 61 of the shaft 40. A bolt 64 engages a keying slot 65, formed on the shaft, and holds the plates 62 keyed to the shaft, but permits longitudinal slidable positioning along the extension 61 to the dotted position shown for purposes which will appear as this description proceeds.

In operation, with the device assembled as shown in Figure 1 and through the hopper 66 in the lid or cover 32, connected with the opening 67 thereof, the raw materials may be added which, in the preparation of calcimine, through this opening the powdered mixture of glue and chalk is added. The blades 39 and 62 may then be set into rotation and during this rotation the vehicle such as water is then added in quantities sufficient to merely form the preliminary paste and after some rotation the additional quantity of water in accordance with the prescribed proportion of materials is then added. Rotation may then be continued for a short period of time, to completely suspend the chalk in the aqueous vehicle and cause solution of the gelatinous binder material, such as glue, where this latter ingredient is included.

The locking hinge 36 is then lifted from engagement with the pin 34 to unlatch the lid and permit a partial rotation. Manual rotation of the lid in a counter clockwise direction may be made until the latch 36 may be made to engage the pin 35 or this partial rotation may take place when the mixer shaft is being rotated and the reaction of the stirrer blades 39 against the fluid contents will gradually move the lid, with its locking hinge, to a new position, wherein the rotation of the lid will carry with it the lugs 28 of the sections 27 to expose the discharge openings 16 and 17 and permit the filtering and screening operation to take place. This partial rotation will move the veins 25 in the position shown in Figure 5, uncovering the openings 16 as well as 17, formed in the side walls of the inner receptacle 11, thus exposing the screening members. The fluid material will then flow out through the bottom 14 to the interior portion of the vessel 10. The mixing mechanism may then be again put into rotation to stir the contents and circulate the suspension of calcimine through the openings 16 and the screens 19 covering the same and back through the openings 17 in continued circulation. By this operation, the gritty, sandy or other objectionable particles which may be present in the dry materials are separated from the material that has flowed to the interior of the vessel 10. From this latter vessel the calcimine or water paint may be dispensed through the nozzle 68, controlled by the faucet or valve 69. The entire device is assembled on suitable legs 70, fragmentarily shown in Figure 1.

With this arrangement I provide a quick and ready method of preparing a water paint, such as calcimine which may be conveniently disposed as required from the valving device 69. I may dispense the same with the mixing mechanism in position or preferably after the batch has been prepared, the mixing mechanism assembled with the lid 32 may be removed and cleaned to await preparation of the next batch. Should some of the contents remain unused in the vessel 10, the inner receptacle 11 may be entirely separated from the lid 32 and the entire mixing mechanism and lid replaced so that if the material has remained overnight and sedimentation of the pigmenting material has taken place, it may be reconverted into a smooth and uniform paste by a few turns of the mixing mechanism. Should the sedimentation be of a material quantity, it is preferred that the bolt 64 be released and the blades 62 moved to the position shown in dotted lines for the extension 61, to thereby bring these blades in closer contact to the bottom 55. In this position, any sedimentation which has taken place may be effectively scraped from the bottom and put into circulation with the aqueous vehicle to again provide a uniform content of proper consistency and dispose all pigmenting material into proper suspension.

Having thus described my invention and illustrated its use, what I claim as new and desire to secure by Letters Patent, is—

1. A combined mixing device of the character described, a dispensing vessel, a mixing vessel, discharge means from said mixing vessel to said dispensing vessel including screening means interposed therebetween and means for closing said discharge means whereby said mixing vessel may be used independently for preparation of the paint batch.

2. In a device for preparing paints of the character described, the combination which comprises a dispensing vessel, a mixing vessel nested within the dispensing vessel, discharge openings between said mixing vessel and dispensing vessel, a common closure for both said vessels and propeller means disposed from said closure member and extending interiorly of said vessel.

3. In a paint mixing device of the character described, a dispensing vessel and a mixing vessel and discharge means between said vessels and control means for said discharge means to rapidly discharge the contents from said mixing vessel into said dispensing vessel, screening means for said discharge means, circulatory openings between said mixing vessel and said dispensing vessel and a propeller means for circulating a paint batch from said mixing vessel to said dispensing vessel.

4. In a paint mixing device of the character described, a dispensing vessel, a mixing vessel, screening means between said mixing vessel and said dispensing vessel and means to control the discharge of a batch from the mixing vessel to the dispensing vessel.

5. In a paint mixing device of the character described, a dispensing vessel, a mixing vessel, screening means between said mixing vessel and said dispensing vessel and means to control the discharge of a batch from the mixing vessel to the dispensing vessel, a closure for said mixing vessel, a mixing propeller disposed from said closure interiorly of said mixing vessel and means controlled by said closure for operating said discharge means.

6. In a paint mixing device of the character described, a dispensing vessel, a mixing vessel, screening means between said mixing vessel and said dispensing vessel and means to control the discharge of a batch from the mixing vessel to the dispensing vessel comprising slidable vein members.

7. In a paint mixing device of the character described, a dispensing vessel, a mixing vessel, screening means between said mixing vessel and said dispensing vessel and means to control the discharge of a batch from the mixing vessel to the dispensing vessel comprising slidable vein members, a rotatable closure for said mixing vessel, said closure having connector members with said slidable veins whereby rotation of said closure will serve to open or close the discharge means from said mixing vessel.

8. In a paint mixing device of the character described, a dispensing vessel and a mixing vessel, said mixing vessel being nested within said dispensing vessel and spaced therefrom, a common closure for said dispensing vessel and said mixing vessel, a mixing member disposed from said closure, means for rotating said mixing member at one free end, an extension at the other end of said mixing member and independently connected mixing veins on said extension, said extension veins being slidably connected to said extension whereby said mixing vessel may be removed and said mixing veins disposed in closer proximity to said dispensing vessel.

In witness whereof I have hereunto signed my name this 17th day of October, 1929.

ABRAHAM L. HENSCHEL.